(12) United States Patent
Chhabra et al.

(10) Patent No.: US 11,516,193 B1
(45) Date of Patent: Nov. 29, 2022

(54) DISTRIBUTION OF DERIVED AUTHENTICATION KEYS TO AUTHENTICATION SERVERS BASED ON TRUST LEVEL

(71) Applicant: Amazon Technologies, Inc., Seattle, WA (US)

(72) Inventors: Jasmeet Chhabra, Bellevue, WA (US); Daniel Stephen Popick, Seattle, WA (US); Luke Edward Kennedy, Seattle, WA (US)

(73) Assignee: Amazon Technologies, Inc., Seattle, WA (US)

(*) Notice: Subject to any disclaimer, the term of this patent is extended or adjusted under 35 U.S.C. 154(b) by 291 days.

(21) Appl. No.: 16/947,881

(22) Filed: Aug. 21, 2020

Related U.S. Application Data (63) Continuation of application No. 15/823,236, filed on Nov. 27, 2017, now Pat. No. 10,785,199.

(51) Int. Cl.
*H04L 29/06* (2006.01)
*H04L 9/40* (2022.01)

(52) U.S. Cl.
CPC .......... *H04L 63/045* (2013.01); *H04L 63/064* (2013.01); *H04L 63/068* (2013.01)

(58) Field of Classification Search
CPC ... H04L 63/045; H04L 63/064; H04L 63/068; H04L 63/12; H04L 63/20; H04L 63/08
USPC .......................................................... 713/168
See application file for complete search history.

(56) References Cited

U.S. PATENT DOCUMENTS

| | | | | |
|---|---|---|---|---|
| 7,865,717 | B2 * | 1/2011 | Calcev | H04W 40/28 |
| | | | | 713/153 |
| 8,363,841 | B2 * | 1/2013 | Garrido | H04L 9/088 |
| | | | | 380/278 |
| 9,356,776 | B2 * | 5/2016 | Ko | H04L 63/08 |
| 9,992,029 | B1 * | 6/2018 | Jackson | H04L 9/3268 |

* cited by examiner

*Primary Examiner* — Longbit Chai
(74) *Attorney, Agent, or Firm* — Lowenstein Sandler LLP (57) ABSTRACT

A key distribution host determines a trust level of a user authentication server, wherein the trust level is based, at least in part, on one or more attributes of the user authentication server and provides one or more authentication keys to the user authentication server only if the trust level of the user authentication server is above a threshold value.

20 Claims, 9 Drawing Sheets

DISTRIBUTION OF DERIVED AUTHENTICATION KEYS TO AUTHENTICATION SERVERS BASED ON TRUST LEVEL

RELATED APPLICATIONS

This application is a divisional of U.S. patent application Ser. No. 15/823,236, filed Nov. 27, 2017, the entire contents of which are hereby incorporated by reference herein.

BACKGROUND

Cloud computing defines a model for enabling ubiquitous, convenient, on-demand network access to a shared pool of configurable computing resources (e.g., networks, servers, storage, applications, services) that can be rapidly provisioned and released with minimal management effort or service provider interaction. Certain characteristics of the cloud computing model include on demand self-service, broad network access, resource pooling, rapid elasticity, and measured service. Cloud computing can include several service models, including Software as a Service (SaaS), Platform as a Service (PaaS), and Infrastructure as a Service (IaaS). The cloud computing model may be implemented according to one of the several deployment models, including private cloud, community cloud, public cloud, or hybrid cloud.

BRIEF DESCRIPTION OF THE DRAWINGS

The present disclosure will be understood more fully from the detailed description given below and from the accompanying drawings of various embodiments of the present disclosure, which, however, should not be taken to limit the present disclosure to the specific embodiments, but are for explanation and understanding only.

DETAILED DESCRIPTION

Embodiments are described for distribution of derived authentication keys to authentication servers based on trust level. In one embodiment, an identity and access management system may sometimes use symmetric keys as long-term credentials for authentication. In order for such a system to work, all the authentication end-points (i.e., servers) may need access to the symmetric keys. As the system grows, the number of authentication servers may increase to a point where it is very hard and/or expensive to maintain the same level of security on all of the servers. This is because the long-term credentials (i.e., the symmetric keys) should be protected using embedded hardware security or even hardware security modules.

With new moves to edge computing, the number of authentication end-points is exploding. Thus, it may be cost prohibitive to try and protect all keys with secure hardware. In addition, the amount of trust that can be put in these authentication servers is not binary, but can exist at different levels. As such, the ability to dynamically manage what secrets can be exposed on these servers would be beneficial. Furthermore, the trust level of these servers is not static and may change dynamically. One naïve solution could be to never expose any keys to the edge hosts and to perform all cryptographic operations on secure key distribution hosts or high trust authentication end points. That solution, however, would require high availability in scenarios of network failures. Even if the connection between edge host and the key distribution hosts is severed, the edge hosts should be able to authenticate clients attempting to access cloud computing services. Low latency at the edge hosts is also desirable since relying on the key distribution hosts for authentication will increase latency considerably.

In one embodiment, the key distribution infrastructure described herein uses a small number of secured key distribution hosts to distribute short term credentials to authentication end-points. The short-term credentials themselves may be protected with cheaper technologies, including for example, tamper resistant software techniques. A dynamic decision can be made about the expiry limit and type of the short-term credentials that that are distributed to the end-point based on an amount of trust in the end-point. As a result, only derived keys can be distributed to the hosts at the edge, and no change in the client protocols is required to support authentication at edge hosts with different trust levels. By keeping the long-term credentials safe at the key distribution host, the system can reducing the overall cost of core secret key protection. In addition, the key distribution host can dynamically decide expiry limits and types of keys that show are distributed to hosts based on a determined level of trust. Furthermore, anomaly detection can be used to dynamically change the trust level of the authentication endpoints. Additional details are provided below with respect to FIGS. 1-8.

Figure 1:
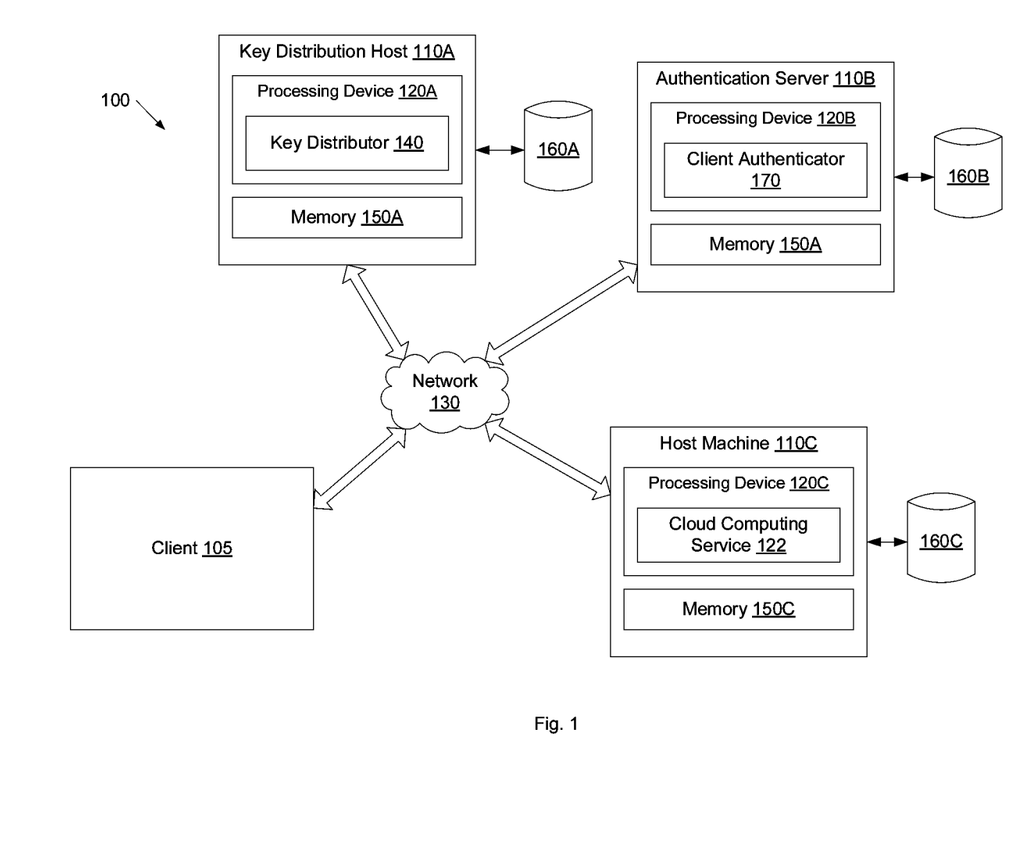
FIG. 1 is a block diagram of an exemplary network architecture, in which embodiments of the present disclosure may operate.

FIG. 1 is a block diagram of an exemplary network architecture 100, in which embodiments of the present disclosure may operate. In one embodiment, the network architecture 100 includes one or more cloud computing devices, such as host machines 110A-110C forming a computing cluster, which may be employed to provide cloud computing services to one or more clients, such as client device 105. Client device 105 may communicate with host machines 110A-110C via one or more networks 130. Client device 105 is representative of any number of clients which may utilize host machines 110A-110C for storing and accessing data in network architecture 100. Client device 105 is representative of any number of stationary or mobile computers such as desktop personal computers (PCs), servers, server farms, workstations, laptops, handheld computers, servers, personal digital assistants (PDAs), smart phones, game consoles and so forth.

In alternative embodiments, the number and type of client devices, host machines, and data storage devices is not limited to those shown in FIG. 1. At various times one or more clients may operate offline. In addition, during operation, individual client device connection types may change as users connect, disconnect, and reconnect to network architecture 100. Further, the systems and methods described herein may be applied to directly attached computing systems or network attached computing systems and may include a host operating system configured to perform one or more aspects of the described methods. Numerous such alternatives are possible and are contemplated.

In one embodiment, network 130 may utilize a variety of techniques including wireless connections, direct local area network (LAN) connections, wide area network (WAN) connections such as the Internet, a router, storage area network, Ethernet, and others. Network 130 may comprise one or more LANs that may also be wireless. Network 130 may further include remote direct memory access (RDMA) hardware and/or software, transmission control protocol/internet protocol (TCP/IP) hardware and/or software, router, repeaters, switches, grids, and/or others. Protocols such as Fibre Channel, Fibre Channel over Ethernet (FCoE), iSCSI, and so forth may be used in network 130. The network 130 may interface with a set of communications protocols used for the Internet such as the Transmission Control Protocol (TCP) and the Internet Protocol (IP), or TCP/IP.

In one embodiment, each host machine 110A-110C may be associated with one or more data storage devices 160A-160C. Examples of data storage devices include solid-state drives (SSDs), flash memory, magnetic or optical disks, tape drives, RAID arrays, EEPROM devices, storage area networks, network-attached storage, and/or any other devices capable of storing data.

Host machines 110A-110C may each include one or more processing devices 120A-120C, each comprising one or more processor cores. Each processor core includes circuitry for executing instructions according to a predefined general-purpose instruction set. The processor cores may access cache memory subsystems for data and computer program instructions. The cache subsystems may be coupled to a memory hierarchy comprising random access memory (RAM) 150A-150C and a storage device 160A-160C. Although three separate host machines 110A-110C are described herein and illustrated in FIG. 1, in other embodiments the functionalities or components associated with each separate host machine 110A-110C may be combined together into the one or more physical machines. For example, key distribution host 110A could be running locally in a hardware protected environment on one host machine, while authentication server 110B could run in a local virtual machine on that same host. In addition, cloud computing service 122 may also run locally in a separate virtual machine, which may or may not be protected. Furthermore, client 105 could also run locally on the same host in a client virtual machine without any special protections.

In one embodiment, host machine 110A embodies a key distribution host (KDH). Key distribution host 110A may be a server computer having embedded hardware security or a hardware security module to protect the symmetric keys used for authentication of a client device 105. Due to the security used to protect the symmetric keys, the number of key distribution hosts in network architecture 100 may be limited. In one embodiment, processing device 120A of key distribution host 110A executes a key distributor 140. Key distributor 140 may be configured to distribute region specific short term keys derived from the symmetric keys to various other edge hosts, such as host 110B, having a certain level of trust. In one embodiment, if key distributor 140 determines that host 110B has a minimum level of trust, based on security attributes of host 110B, key distributor 140 may distribute the short term authentication key to host 110B, so that host 110B can authenticate client device 105 locally.

In one embodiment, host machine 110B embodies an authentication end-point or an authentication server. Authentication server 110B may be a server computer having less security than key distribution host 110A. Due to the lesser security requirements, the number of authentication servers in network architecture 100 may be significantly higher than the number of key distribution hosts. As a result, authentication server 110B may be located in closer physical proximity to client 105 and/or host machine 110C than key distribution hosts 110A. Thus, if authentication server 110B is able to authenticate client 105 is associated with a request to access host machine 110C, the process may be completed much faster than if going back to key distribution host 110A is required. In one embodiment, processing device 120B of authentication server 110B executes client authenticator 170. Client authenticator 170 may be configured to request and receive the short term authentication keys from key distribution host 110A and use those keys to authenticate client device 105. In one embodiment, there may be multiple key distribution hosts 110A, and one authentication server 110B may be requesting authentication keys from more than one of the key distribution hosts 110A. In this scenario, each individual key distribution host 110A may make a separate decision about the trust level of authentication server 110B and provide its own authentication keys based on that decision.

In one embodiment, processing device 120C of host machine 110C executes a cloud computing service 122. Cloud computing defines a model for enabling ubiquitous, convenient, on-demand network access to a shared pool of configurable computing resources (e.g., networks, servers, storage, applications, services) that can be rapidly provisioned and released with minimal management effort or service provider interaction. Certain characteristics of cloud computing service 122 may include on demand self-service, broad network access, resource pooling, rapid elasticity, and measured service. Cloud computing service 122 can include several service models, including Software as a Service (SaaS), Platform as a Service (PaaS), and Infrastructure as a Service (IaaS). Cloud computing service 122 may be implemented according to one of the several deployment models, including private cloud, community cloud, public cloud, or hybrid cloud.

Figure 2:
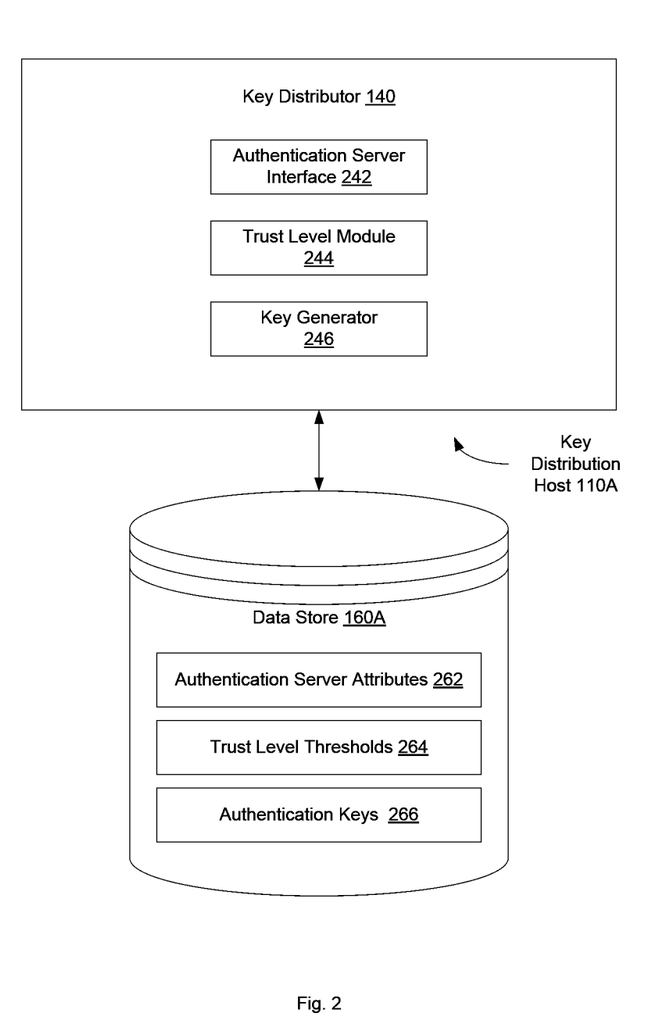
FIG. 2 is a block diagram illustrating a key distributor, according to an embodiment.

FIG. 2 is a block diagram illustrating key distributor 140, according to an embodiment. In one embodiment, key distributor 140 includes authentication server interface 242, trust level module 244, and key generator 246. This arrangement of modules and components may be a logical separation, and in other embodiments, these modules or other components can be combined together or separated in further components, according to a particular implementation. In one embodiment, data store 160A is connected to key distributor 140 and includes authentication server attributes 262, trust level thresholds 264 and authentication keys 266. In one implementation, one physical node (e.g., key distribution host 110A) may include both key distributor 140 and data store 160A. In another embodiment, data store 160A may be external to the physical node and may be connected over a network or other connection. In other implementations, the physical node and key distributor 140 may include different and/or additional components and applications which are not shown to simplify the description. Data store 160A may be embodied on one or more mass storage devices which can include, for example, flash memory, magnetic or optical disks, or tape drives; read-only memory (ROM); random-access memory (RAM); erasable programmable memory (e.g., EPROM and EEPROM); flash memory; or any other type of storage medium.

In one embodiment, authentication server interface 242 manages interactions between key distributor and authentication server 110B. For example, authentication server interface 242 may perform operations such as, establishing a mutually authenticated secure communication channel with user authentication server 110B, sending a request for one or more attributes 262 of user authentication server 110B to user authentication server 110B over the secure communication channel, receiving an indication of the one or more attributes 262 of user authentication server 110B from user authentication server 110B, receiving a request for one or more authentication keys 266 from user authentication server 110B, providing one or more authentication keys 266 to user authentication server 110B, and/or instructing user authentication server 110B server to authenticate user requests remotely with key distribution host 110A.

In one embodiment, trust level module 244 determines a trust level of user authentication server 110B based, at least in part, on one or more attributes 262 or characteristics of user authentication server 110B. The one or more attributes 262 or characteristics may include, for example, a geographic region where the user authentication server 110B is located, a hardware security status of the user authentication server 110B, a software patch level of the user authentication server 110B, a device type of the user authentication server 110B, or other attributes. In one embodiment, there may be certain geographic regions where the likelihood of an attempted attack to illicitly obtain the authentication keys 266 is more likely. As such, trust level module 244 may assign an authentication server 110B located in one of those geographic regions a lower trust level. In one embodiment, authentication server 110B may be embodied on different types of devices having different levels of hardware security and different software installed thereon. In general, trust level module 244 may assign an authentication server 110B having stronger hardware security and up to date security software a higher trust level. In one embodiment, trust level module 244 further determines whether the level of trust comprises at least one of a high level of trust, a medium level of trust or a low level of trust. Each discrete level may have associated thresholds 264 to which trust level module 244 can compare the determined the trust level. Depending on the embodiment, there may be any number of different thresholds 264 and/or discrete trust levels. In addition, the number of trust levels or the trust levels themselves may be dynamic. In one embodiment, the attributes are continuously or periodically updated, such that trust level module 244 can dynamically determine the trust level based on the updated attribute information.

In one embodiment, trust level module 244 further implements anomaly detection in order to determine the trust level of user authentication server 110B. In one embodiment, trust level module 244 continuously or periodically monitors communications with and behavior of user authentication server 110B to detect the occurrence of any potential anomalies. These anomalies may include, for example, a physical or software breach or other service interruption that could potentially impact the trust level. Upon detection of such an anomaly, trust level module 244 may reevaluate the trust level and potentially change the trust level assigned to the user authentication server 110B.

In one embodiment, key generator 246 generates a number of authentication keys 266, each valid during a different period of time, wherein the number is determined according to the trust level of user authentication server 110B. In one embodiment, key generator 246 applies a key derivation function to derive one or more authentication keys 266 from a secret values, such as the symmetric key stored by key distribution host 110A. In one embodiment, additional embodiments to the key derivation function can include the date or other period of time for which the authentication key will be valid and a region where the user authentication server 110B is located. Thus, the result can be a region specific short term key that can be provided safely to user authentication server 110B. In one embodiment, the key derivation function can be a keyed-hash message authentication code (HMAC) secure hash algorithm (SHA-256), although in other embodiments, some other key derivation function may be used. In one embodiment, key generator 246 may generate a series of five to seven keys, for a high trust authentication server, a single key for a medium trust authentication server and zero keys for a low trust authentication server. In one embodiment, the authentication keys 266 comprise cryptographic keys including a parameter that determines the functional output of a cryptographic algorithm (i.e., the key derivation function). In one embodiment, the authentication keys 266 may be provided to user authentication server 110B as part of a tuple or other larger data structure. Doing so allows key distribution host 110A to send both a secret (i.e., authentication key 266) as well as additional scoping data for the use of that secret (e.g., a full X.509 certificate, partial signatures derived from the symmetric secret key, additional tokens which restrict or extend the use of the included secret). Pushing this additional information allows key distribution host 110A to incorporate more fine-grained controls in what gets issued to user authentication server 110B, as opposed to a binary decision of whether to issue a key or not.

Figure 3:
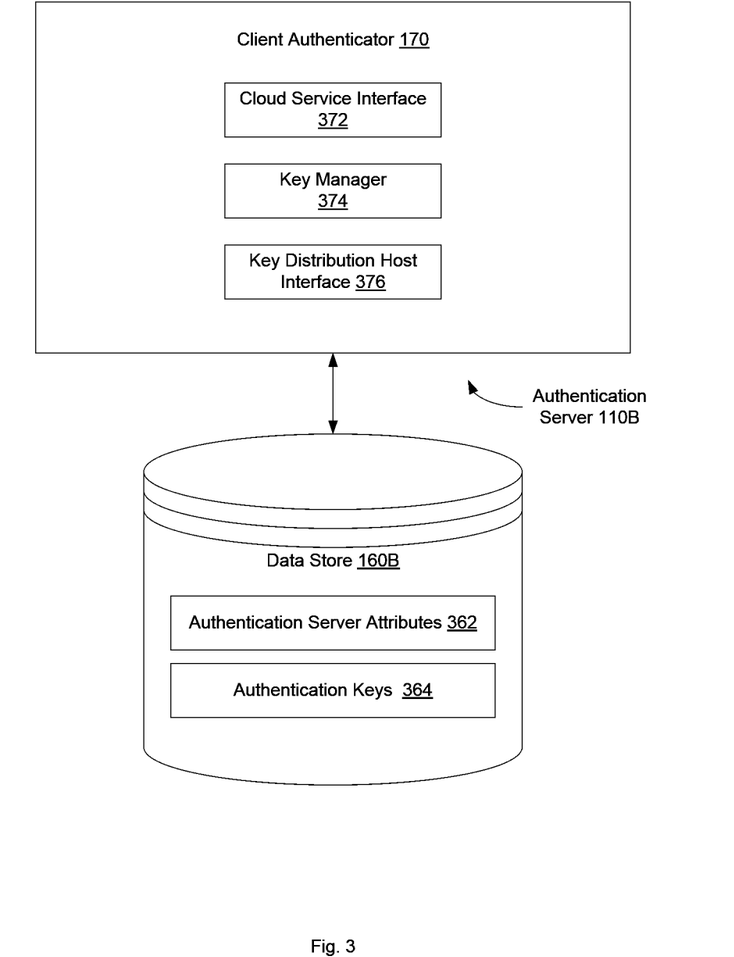
FIG. 3 is a block diagram illustrating a client authenticator, according to an embodiment.

FIG. 3 is a block diagram illustrating client authenticator 170, according to an embodiment. In one embodiment, client authenticator 170 includes cloud service interface 372, key manager 374 and key distribution host interface 376. This arrangement of modules and components may be a logical separation, and in other embodiments, these modules or other components can be combined together or separated in further components, according to a particular implementation. In one embodiment, data store 160B is connected to client authenticator 170 and includes authentication server attributes 362 and authentication keys 364. In one implementation, one physical node (e.g., authentication server 110B) may include both client authenticator 170 and data store 160B. In another embodiment, data store 160B may be external to the physical node and may be connected over a network or other connection. In other implementations, the physical node and client authenticator 170 may include different and/or additional components and applications which are not shown to simplify the description. Data store 160B may be embodied on one or more mass storage devices which can include, for example, flash memory, magnetic or optical disks, or tape drives; read-only memory (ROM); random-access memory (RAM); erasable programmable memory (e.g., EPROM and EEPROM); flash memory; or any other type of storage medium.

In one embodiment, cloud service interface 372 manages interactions between client authenticator 170 and cloud computing service 122 running on host machine 110C. For example, cloud service interface 372 may perform operations such as, receiving an authentication request from cloud computing service 122, the request comprising a client key provided by client device 105 seeking access to cloud computing service 122, and providing the authentication result to cloud computing service 122, the cloud computing service 122 to grant access to client device 105 in view of the authentication result.

In one embodiment, key manager 374 determines whether an authentication key for a current day is available from one or more authentication keys 364 received at user authentication server 110B from key distribution host 110A according to a trust level of the user authentication server 110B. Responsive to the authentication key for the current day being available, key manager 374 compares the client key received from cloud computing service 122 to the authentication key for the current day to generate an authentication result for the client device 105. If the received client key matches the stored authentication key, the client 150 is authenticated and the authentication result can indicate that client device 105 may be granted access to cloud computing service 122. If the received client key does not match the stored authentication key, the client 150 is not authenticated and the authentication result can indicate that client device 105 may be denied access to cloud computing service 122.

In one embodiment, key distribution host interface 376 manages interactions between client authenticator 170 and key distribution host 110A. For example, key distribution host interface 376 may perform operations such as, sending a remote authentication request comprising the client key to key distribution host 110A responsive to the authentication key for the current day not being available at user authentication server 110B and receiving a remote authentication result from key distribution host 110A.

Figure 4A:
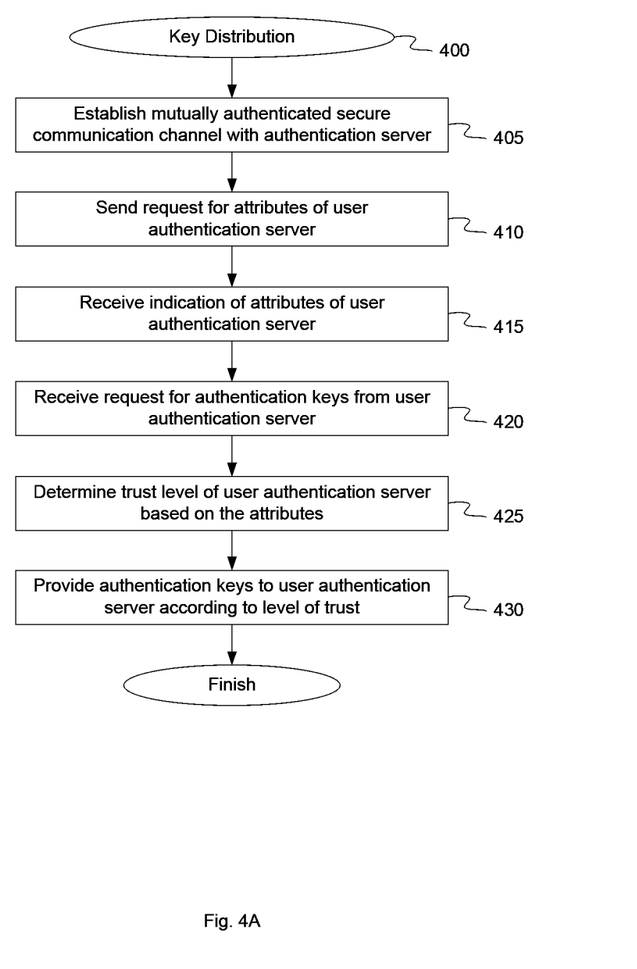
FIGS. 4A and 4B are flow diagrams illustrating a method of key distribution based on trust level, according to an embodiment.

FIG. 4A is a flow diagram illustrating method of key distribution based on trust level, according to an embodiment. The method 400 may be performed by processing logic that comprises hardware (e.g., circuitry, dedicated logic, programmable logic, microcode, etc.), software, firmware, or a combination thereof. In one embodiment, method 400 may be performed by key distributor 140 of key distribution host 110A, as shown in FIGS. 1 and 2.

Referring to FIG. 4, at block 405, method 400 establishes a mutually authenticated secure communication channel with user authentication server 110B. In one embodiment, authentication server interface 242 initiates a mutually authenticated secure socket layer (SSL) handshake in which authentication server interface 242 requests a certificate from authentication server 110B while providing its own certificate to authentication server 110B to establish the secure channel. In other embodiments, some other protocol may be used.

At block 410, method 400 sends a request for one or more attributes of user authentication server 110B to user authentication server 110B server over the secure communication channel. In one embodiment, authentication server interface 242 sends the request when a new user authentication server 110B is detected, periodically, or in response to a specific command from a system administrator or other user. The attributes are indicative of the characteristics of authentication server 110B, which can be used to determine how trustworthy authentication server 110B is. Since secret keys will be provided to authentication server 110B, it is desirable to establish a minimum level of trust that the secret keys will not be compromised.

At block 415, method 400 receives an indication of the one or more attributes 262 of the user authentication server 110B from the user authentication server 110B. In one embodiment, authentication server interface 242 receives the one or more attributes 262, which may include, for example, a geographic region where the user authentication server 110B is located, a hardware security status of the user authentication server 110B, a software patch level of the user authentication server 110B, a device type of the user authentication server 110B, or other attributes.

At block 420, method 400 receives a request for one or more authentication keys from the user authentication server 110B. In one embodiment, authentication server interface 242 receives the request from authentication server 110B when a new user authentication server 110B is detected, periodically, or in response to a specific command from a system administrator or other user.

At block 425, method 400 determines a trust level of user authentication server 110B based, at least in part, on the one or more attributes 262 of the user authentication server 110B. In one embodiment, trust level module 244 further determines whether the level of trust comprises at least one of a high level of trust, a medium level of trust or a low level of trust. Each discrete level may have associated thresholds 264 to which trust level module 244 can compare the determined the trust level. Depending on the embodiment, there may be any number of different thresholds 264 and/or discrete trust levels.

At block 430, method 400 provides one or more authentication keys to the user authentication server 110B only if the trust level of user authentication server 110B is above a threshold value. In one embodiment, key generator 246 generates a number of authentication keys 266, each valid during a different period of time, wherein the number is determined according to the trust level of user authentication server 110B. In one embodiment, key generator 246 may generate a series of five to seven keys, for a high trust authentication server, a single key for a medium trust authentication server and zero keys for a low trust authentication server. In one embodiment, authentication server interface 242 provides the keys to user authentication server 110B according to the trust level.

Figure 4B:
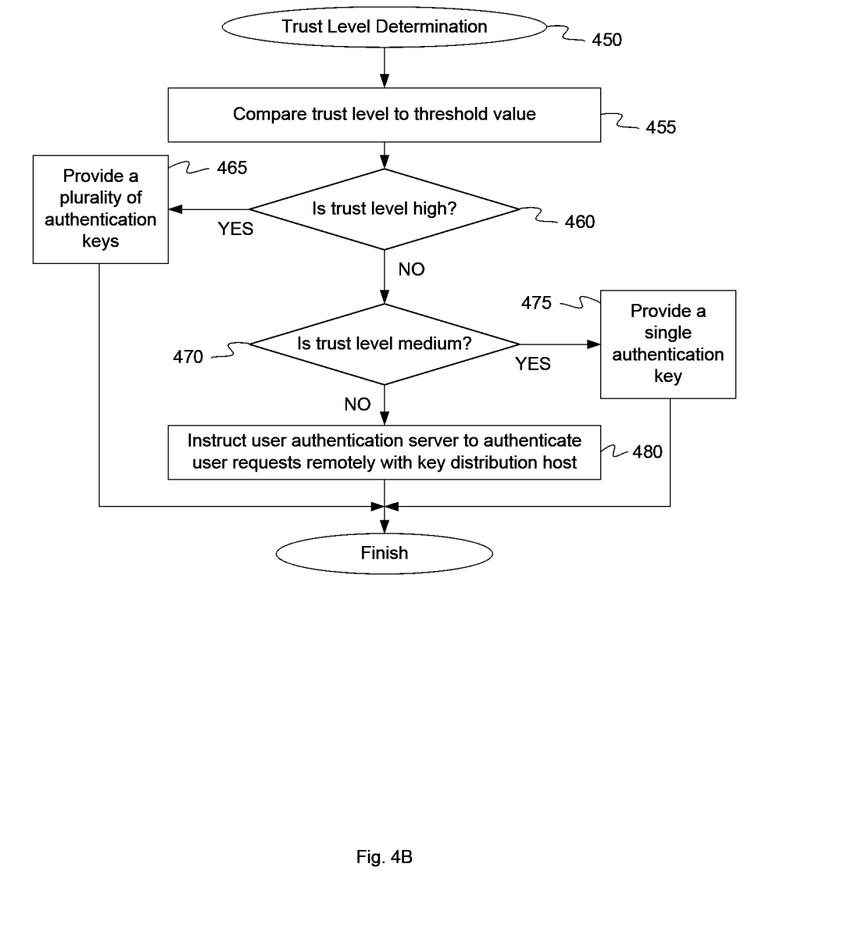

FIG. 4B is a flow diagram illustrating method of key distribution based on a trust level determination, according to an embodiment. The method 450 may be performed by processing logic that comprises hardware (e.g., circuitry, dedicated logic, programmable logic, microcode, etc.), software, firmware, or a combination thereof. In one embodiment, method 450 may be performed by key distributor 140 of key distribution host 110A, as shown in FIGS. 1 and 2.

Referring to FIG. 4, at block 455, method 450 compares a determined trust level to one or more threshold values. In one embodiment, trust level module 244 determines whether the level of trust comprises at least one of a high level of trust, a medium level of trust or a low level of trust. Each discrete level may have associated thresholds 264 to which trust level module 244 can compare the determined the trust level. Depending on the embodiment, there may be any number of different thresholds 264 and/or discrete trust levels.

At block 460, method 450 determines whether the trust level comprises a high trust level. In one embodiment, trust level module 244 compares the trust level of authentication server 110B to a threshold corresponding to the high trust level. If the trust level meets or exceeds the threshold, trust level module 244 determines that the authentications server 110B has a high trust level.

If so, at block 465, method 450 provides a plurality of authentication keys to user authentication server 110B. In one embodiment, key generator 246 may generate a series of five to seven keys for a high trust authentication server and authentication server interface 242 may provide them to authentication server 110B. This series of keys, each valid for a different day or other period of time, can be used by authentication server 110B for the next five to seven days. As such, authentication server 110B need not go back to key distribution host 110A to authenticate client devices until all of the keys in the series have expired.

If the trust level is not a high trust level, at block 470, method 450 determines whether the trust level comprises a medium trust level. In one embodiment, trust level module 244 compares the trust level of authentication server 110B to a threshold or set of thresholds corresponding to the medium trust level. If the trust level meets or exceeds the threshold, or falls between the set of thresholds, trust level module 244 determines that the authentications server 110B has a medium trust level.

If so, at block 475, method 450 provides a single authentication key to user authentication server 110B. In one embodiment, key generator 246 may a single key for a medium trust authentication server and authentication server interface 242 may provide the key to authentication server 110B. This key, valid for a single day or other set period of time, can be used by authentication server 110B for that day or other period of time. As such, authentication server 110B need not go back to key distribution host 110A to authenticate client devices until the key has expired.

If the trust level is not a medium trust level, at block 480, method 450 provides zero authentication keys to user authentication server 110B and instruct user authentication server 110B to authenticate user requests remotely with key distribution host 110A.

Figure 5:
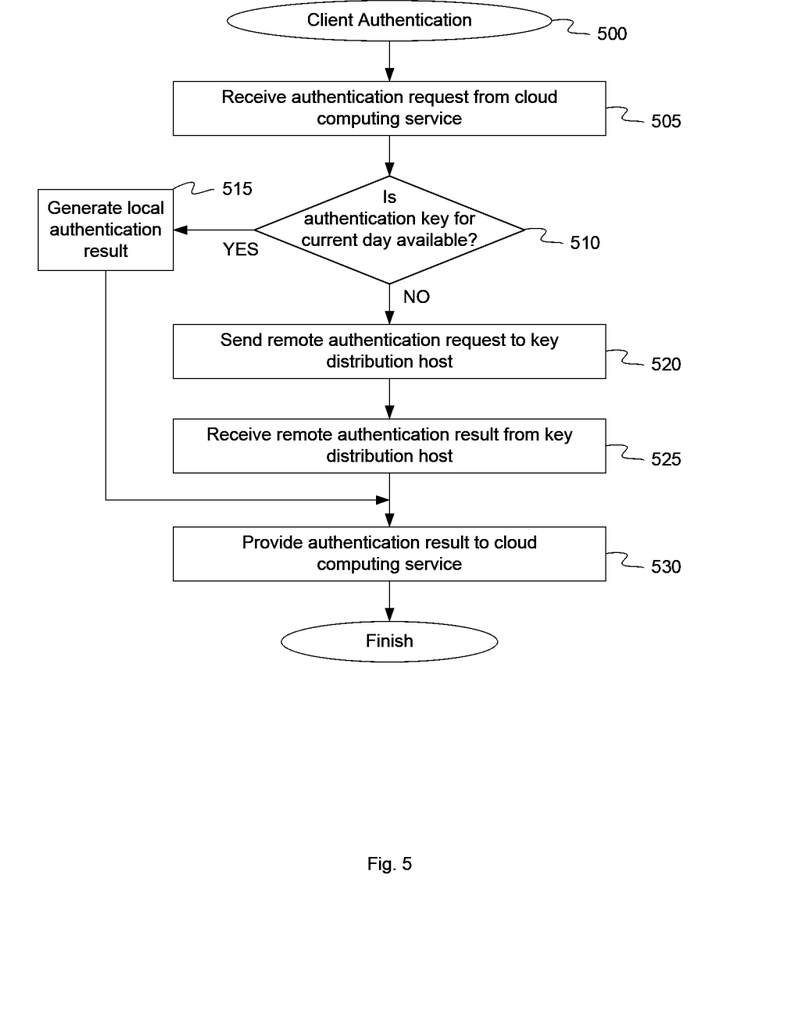
FIG. 5 is a flow diagram illustrating method of client authentication, according to an embodiment.

FIG. 5 is a flow diagram illustrating method of client authentication, according to an embodiment. The method 500 may be performed by processing logic that comprises hardware (e.g., circuitry, dedicated logic, programmable logic, microcode, etc.), software, firmware, or a combination thereof. In one embodiment, method 500 may be performed by authentication server 110B, as shown in FIGS. 1 and 3.

Referring to FIG. 5, at block 505, method 500 receives an authentication request from cloud computing service 122 running on host machine 110C, the request comprising a client key provided by a client device 105 seeking access to the cloud computing service 122. In one embodiment, cloud service interface 372 receives the request from cloud computing service 122 when a client device 105 is attempting to access cloud computing service 122. In one embodiment, the request includes a client key provided by client device 105.

At block 510, method 500 determines whether an authentication key for a current day is available from one or more authentication keys 364 received from key distribution host 110A according to a trust level of the user authentication server 110B. In one embodiment, key manager 374 determines a current day when the request is received or a day or period time for which access is requested (which may be potentially different than the current day) and determines whether a corresponding authentication key 364 was received from key distribution host 110A. As the number of keys received is dependent on the trust level of authentication server 110B, authentication server 110B may or may not have the corresponding authentication key.

If an authentication key for the current day is available, at block 515, method 500 compares the client key to the authentication key for the current day to generate an authentication result for the client device 105. If the received client key matches the stored authentication key, the client 150 is authenticated and the authentication result can indicate that client device 105 may be granted access to cloud computing service 122. If the received client key does not match the stored authentication key, the client 150 is not authenticated and the authentication result can indicate that client device 105 may be denied access to cloud computing service 122. This authentication can be performed entirely at authentication server 110B without the need to contact key distribution host 110A, which could take time and resources, and lead to unnecessary latency in the user experience.

If an authentication key for the current day is not available, at block 520, method 500 sends a remote authentication request comprising the client key to key distribution host 110A, and at block 525, receives a remote authentication result from key distribution host 110A. In one embodiment, key distribution host interface 376 exchanges messages with key distribution host 110A, which can perform the comparison to authenticate the user.

At block 530, method 500 provides the authentication result to the cloud computing service 122, the cloud computing service 122 to grant access to the client device 105 in view of the authentication result. In one embodiment, cloud service interface 372 provides the authentication result, which was either generated locally at block 515 or received from remote key distribution host 110A at block 525, to cloud computing service 122. Cloud computing service 122 can grant or deny access to the client device 105 as appropriate in view of the authentication result.

Figure 6:
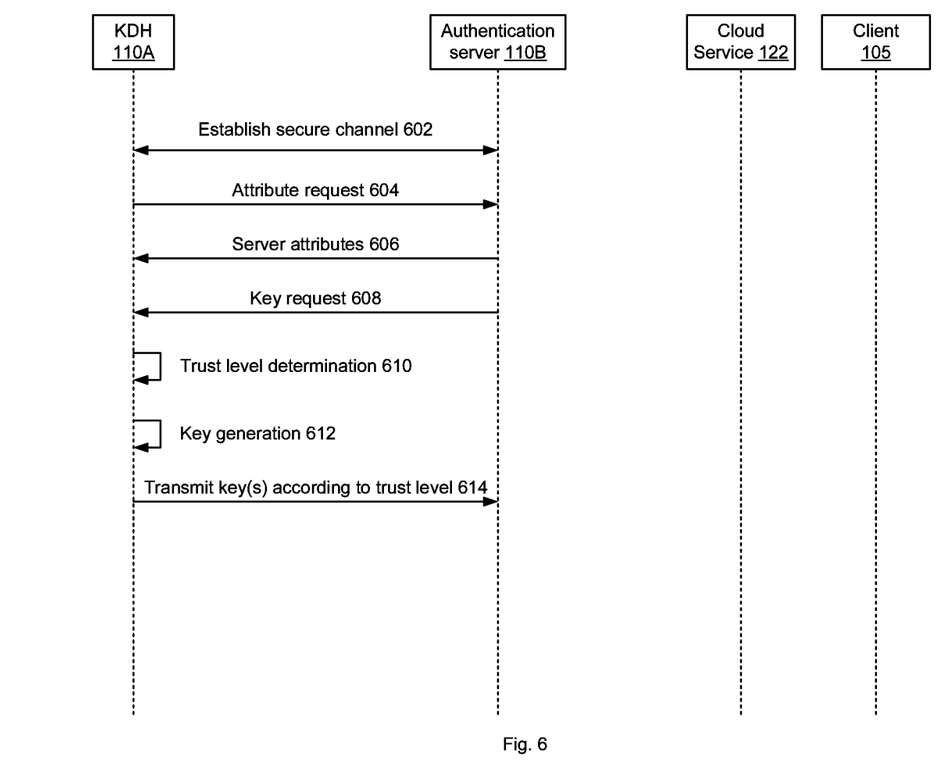
FIG. 6 is a sequence diagram illustrating key distribution, according to an embodiment.

FIG. 6 is a sequence diagram illustrating key distribution, according to an embodiment. At 602, key distribution host 110A and authentication server 110B establish a secure communication channel. One example is a mutually authenticated secure socket layer (SSL) channel. At 604, key distribution host 110A sends an attribute request to authentication server 110B. At 606, authentication server 110B responds to the request and provides one or more server attributes. The attributes may include, for example, one or more of a geographic region where the user authentication server is located, a hardware security status of the user authentication server, a software patch level of the user authentication server, a device type of the user authentication server, or other attribute. At 608, authentication server 110B sends a request for one or more authentication keys to key distribution host 110A. At 610, key distribution host 110A determines a trust level of authentication server 110B based, at least in part, on one or more attributes of the user authentication server. At 612, key distribution host 110A generates a series of one or more keys, each valid for a different day, wherein the number of keys is determined according to the trust level of the user authentication server. For a high trust endpoint, key distribution host 110A may generate a series of five to seven keys, for example. For a medium trust endpoint, key distribution host 110A may generate a single key. For a low trust endpoint, key distribution host 110A may not generate any keys. At 614, key distribution host 110A provides the authentication key or keys to the authentication server 110B for use by the authentication server 110B to authenticate users (e.g., client device 105) of cloud computing service 122 for a limited period of time.

Figure 7:
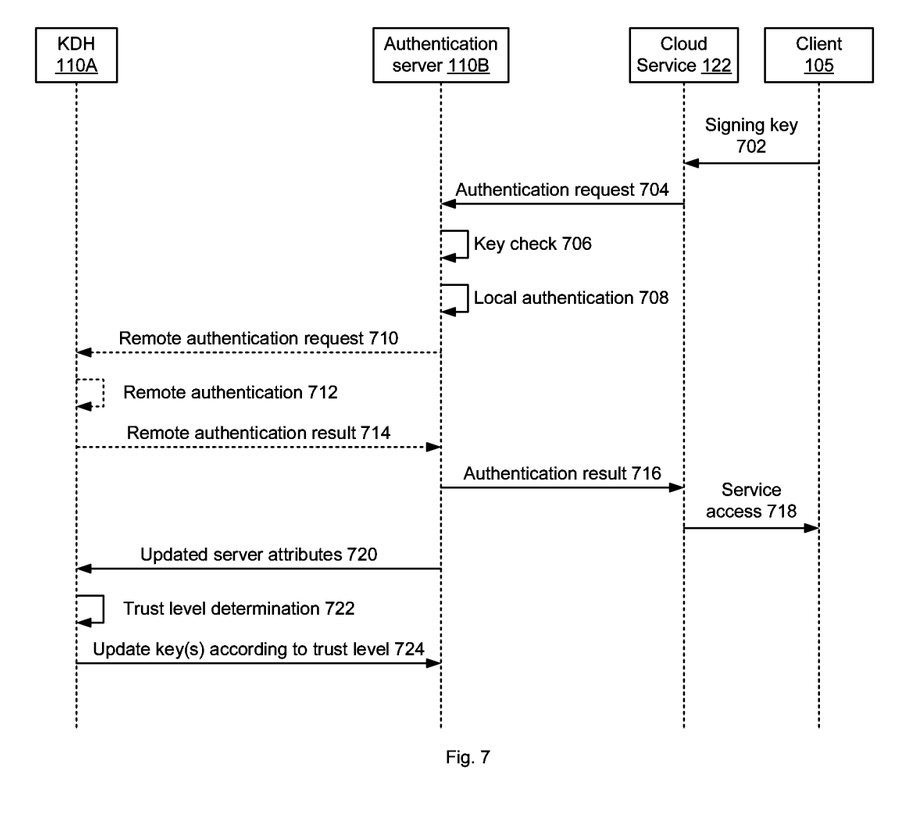
FIG. 7 is a sequence diagram illustrating client authentication, according to an embodiment.

FIG. 7 is a sequence diagram illustrating client authentication, according to an embodiment. At 702, client 105 provides a signing key to cloud service 122 along with a request to access cloud service 122. At 704, cloud service 122 sends an authentication request to authentication server 110B comprising a client key provided by client device 105. At 706, authentication server 110B determines whether an authentication key for a current day is available from one or more authentication keys received from key distribution host 110A according to a trust level of authentication server 110B. At 708, responsive to the authentication key for the current day being available, authentication server 110B compares the client key to the authentication key for the current day to generate an authentication result for the client device 105. At 710, if the authentication key for the current day is not available, authentication server 110B optionally send a remote authentication request comprising the client key to the key distribution host 110A. At 712, key distribution host 110A remotely authenticates client device 105 by comparing the signing key to the stored symmetric key. At 714, key distribution host 714 provides a remote authentication result to authentication server 110B indicating the results of the comparison. At 716, authentication server 110B provides the authentication result, whether generated locally or remotely, to the cloud computing service 122. At 718, cloud service 122 either grants or denies access to client 105 based on the authentication result.

At 720, authentication server 110B provides updated server attributes to key distribution host 110A. This step may be performed periodically and the updated attributes may be used as training data for an anomaly detection algorithm executed by key distribution host 110A. In one embodiment, trust level module 244 further implements an artificial intelligence or machine learning component to further improve the anomaly detection algorithm or the trust level determination process. In one embodiment, trust level module 244 uses machine learning to learn, from the changes and events occurring in the attributes of authentication server 110B, what changes occur in the resulting trust level determination. Trust level module 244 may use one of various unsupervised or supervised machine learning techniques, such as a cluster analysis algorithm, a self-organizing map, linear regression, logistic regression, a decision tree, support vector machine (SVM), Naive Bayes, K-nearest neighbor (KNN), K-Means clustering, Random Forest, Dimensionality Reduction Algorithms, Gradient Boost & Adaboost, etc., to learn how the attributes affect the resulting trust level.

In one embodiment, trust level module 244 applies one or more supervised machine learning techniques to train a machine learning model to determine the trust level of authentication server 110B. Examples of supervised machine learning models that may be trained include an artificial neural network, a convolutional network, a support vector machine, and so on.

At 722, key distribution host performs an updated trust level determination based on the updated server attributes and if there is a change in the trust level, at 724, purges keys from authentication server 110B or sends new and/or additional keys to authentication server 110B as appropriate.

Figure 8:
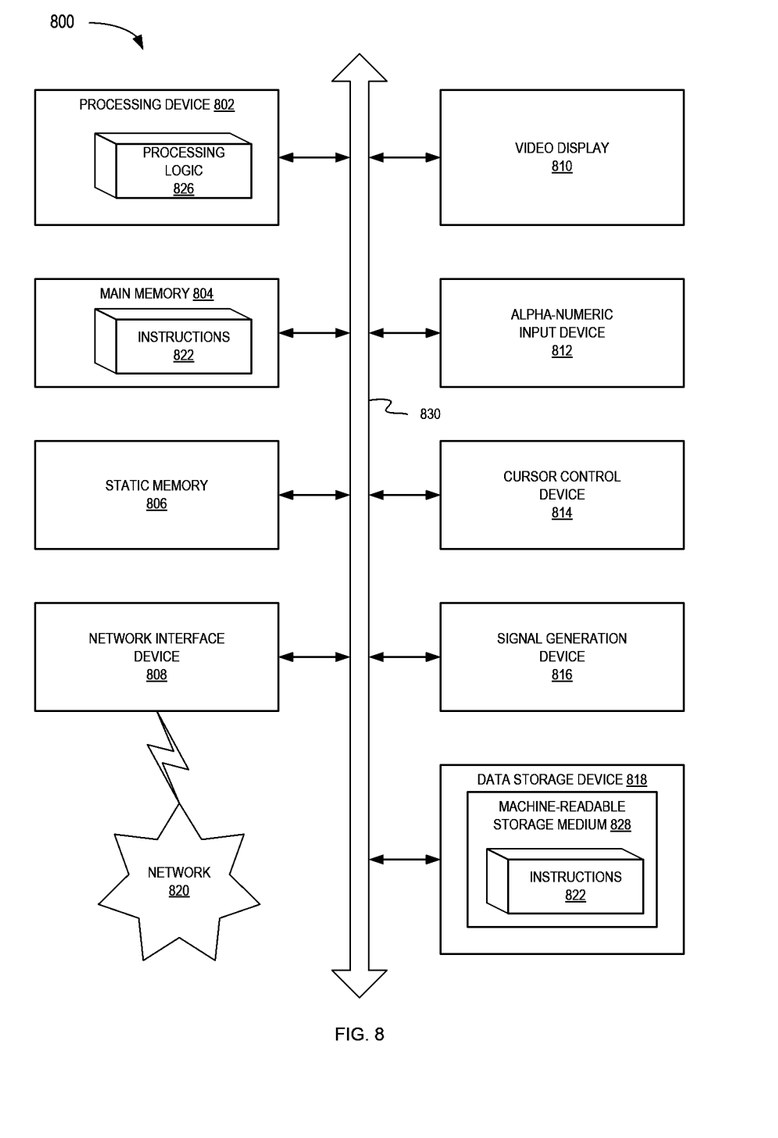
FIG. 8 is a block diagram illustrating one embodiment of a computer system, according to an embodiment.

FIG. 8 illustrates a diagrammatic representation of a machine in the exemplary form of a computer system 800 within which a set of instructions, for causing the machine to perform any one or more of the methodologies discussed herein, may be executed. In alternative embodiments, the machine may be connected (e.g., networked) to other machines in a local area network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a game console, a web appliance, a server, a host machine, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. In one embodiment, computer system 800 may be representative of a computing device, such as host machines 110A-110C or client device 105.

The exemplary computer system 800 includes a processing device 802, a main memory 804 (e.g., read-only memory (ROM), flash memory, dynamic random access memory (DRAM) (such as synchronous DRAM (SDRAM) or Rambus DRAM (RDRAM), etc.), a static memory 806 (e.g., flash memory, static random access memory (SRAM), etc.), and a data storage device 818, which communicate with each other via a bus 830. Any of the signals provided over various buses described herein may be time multiplexed with other signals and provided over one or more common buses. Additionally, the interconnection between circuit components or blocks may be shown as buses or as single signal lines. Each of the buses may alternatively be one or more single signal lines and each of the single signal lines may alternatively be buses.

Processing device 802 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 802 may also be one or more special-purpose processing devices such as an application specific integrated circuit (ASIC), a field programmable gate array (FPGA), a digital signal processor (DSP), network processor, or the like. The processing device 802 is configured to execute processing logic 826 for performing the operations and steps discussed herein.

The computer system 800 may further include a network interface device 808. The computer system 800 also may include a video display unit 810 (e.g., a liquid crystal display (LCD) or a cathode ray tube (CRT)), an alphanumeric input device 812 (e.g., a keyboard), a cursor control device 814 (e.g., a mouse), and a signal generation device 816 (e.g., a speaker).

The data storage device 818 may include a machine-accessible storage medium 828, on which is stored one or more set of instructions 822 (e.g., software) embodying any one or more of the methodologies of functions described herein. The instructions 822 may also reside, completely or at least partially, within the main memory 804 and/or within the processing device 802 during execution thereof by the computer system 800; the main memory 804 and the processing device 802 also constituting machine-accessible storage media. The instructions 822 may further be transmitted or received over a network 820 via the network interface device 808.

The machine-readable storage medium 828 may also be used to store instructions for distribution of derived authentication keys to authentication servers based on trust level, as described herein. While the machine-readable storage medium 828 is shown in an exemplary embodiment to be a single medium, the term "machine-readable storage medium" should be taken to include a single medium or multiple media (e.g., a centralized or distributed database, and/or associated caches and servers) that store the one or more sets of instructions. A machine-readable medium includes any mechanism for storing information in a form (e.g., software, processing application) readable by a machine (e.g., a computer). The machine-readable medium may include, but is not limited to, magnetic storage medium (e.g., floppy diskette); optical storage medium (e.g., CD-ROM); magneto-optical storage medium; read-only memory (ROM); random-access memory (RAM); erasable programmable memory (e.g., EPROM and EEPROM); flash memory; or another type of medium suitable for storing electronic instructions.

The preceding description sets forth numerous specific details such as examples of specific systems, components, methods, and so forth, in order to provide a good understanding of several embodiments of the present invention. It will be apparent to one skilled in the art, however, that at least some embodiments of the present invention may be practiced without these specific details. In other instances, well-known components or methods are not described in detail or are presented in simple block diagram format in order to avoid unnecessarily obscuring the present invention. Thus, the specific details set forth are merely exemplary. Particular implementations may vary from these exemplary details and still be contemplated to be within the scope of the present invention.

In the above description, numerous details are set forth. It will be apparent, however, to one of ordinary skill in the art having the benefit of this disclosure, that embodiments of the invention may be practiced without these specific details. In some instances, well-known structures and devices are shown in block diagram form, rather than in detail, in order to avoid obscuring the description.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "determining", "identifying", "adding", "selecting" or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Embodiments of the invention also relate to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

The algorithms and displays presented herein are not inherently related to any particular computer or other apparatus. Various general purpose systems may be used with programs in accordance with the teachings herein, or it may prove convenient to construct a more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A method of distributing derived authentication keys based on trust levels comprising:
   receiving, by a user authentication server, an authentication request from a cloud computing service, the request comprising a client key provided by a client device seeking access to the cloud computing service;
   determining whether an authentication key for a current time period is available from a number of limited-term authentication keys received at the user authentication server and sent from a key distribution host according to a trust level of the user authentication server; and
   comparing the client key to the authentication key for the current time period to generate an authentication result for the client device responsive to the authentication key for the current time period being available at the user authentication server to authenticate the client device requesting access to the cloud computing service.

2. The method of claim 1, further comprising:
   sending a remote authentication request comprising the client key to the key distribution host responsive to the authentication key for the current time period not being available at the user authentication server; and
   receiving a remote authentication result from the key distribution host.

3. The method of claim 1, further comprising:
   providing the authentication result to the cloud computing service, the cloud computing service to grant access to the client device in view of the authentication result.

4. The method of claim 1, wherein the trust level is based, at least in part, on one or more attributes of the user authentication server.

5. The method of claim 4, wherein the one or more attributes of the user authentication server comprise one or more of a geographic region where the user authentication server is located, a hardware security status of the user authentication server, a software patch level of the user authentication server, a device type of the user authentication server, or an occurrence of an anomaly at the user authentication server.

6. The method of claim 1, wherein the one or more authentication keys received at the user authentication server from the key distribution host comprise a number of keys, each valid during a different time period, and wherein the number is determined according to the trust level of the user authentication server.

7. The method of claim 1, further comprising:
determining whether an authentication key associated with a time period for which access is requested is available from the one or more authentication keys received at the user authentication server; and
comparing the client key to the authentication key associated with the time period for which access is requested to generate an authentication result for the client device responsive to the authentication key associated with the time period for which access is requested being available at the user authentication server.

8. A computing device for distributing derived authentication keys based on trust levels comprising:
one or more hardware processors; and
memory to store computer-executable instructions that, if executed, cause the one or more hardware processors to:
receive, by a user authentication server, an authentication request from a cloud computing service, the request comprising a client key provided by a client device seeking access to the cloud computing service;
determine whether an authentication key for a current time period is available from a number of limited-term authentication keys received at the user authentication server and sent from a key distribution host according to a trust level of the user authentication server; and
compare the client key to the authentication key for the current time period to generate an authentication result for the client device responsive to the authentication key for the current time period being available at the user authentication server to authenticate the client device requesting access to the cloud computing service.

9. The computing device of claim 8, wherein the instructions further cause the one or more processors to:
send a remote authentication request comprising the client key to the key distribution host responsive to the authentication key for the current time period not being available at the user authentication server; and
receive a remote authentication result from the key distribution host.

10. The computing device of claim 8, wherein the instructions further cause the one or more processors to:
provide the authentication result to the cloud computing service, the cloud computing service to grant access to the client device in view of the authentication result.

11. The computing device of claim 8, wherein the trust level is based, at least in part, on one or more attributes of the user authentication server.

12. The computing device of claim 11, wherein the one or more attributes of the user authentication server comprise one or more of a geographic region where the user authentication server is located, a hardware security status of the user authentication server, a software patch level of the user authentication server, a device type of the user authentication server, or an occurrence of an anomaly at the user authentication server.

13. The computing device of claim 8, wherein the one or more authentication keys received at the user authentication server from the key distribution host comprise a number of keys, each valid during a different time period, wherein the number is determined according to the trust level of the user authentication server.

14. The computing device of claim 8, wherein the instructions further cause the one or more processors to:
determine whether an authentication key associated with a time period for which access is requested is available from the one or more authentication keys received at the user authentication server; and
compare the client key to the authentication key associated with the time period for which access is requested to generate an authentication result for the client device responsive to the authentication key associated with the time period for which access is requested being available at the user authentication server.

15. One or more non-transitory machine-readable storage mediums having stored therein instructions, for distributing derived authentication keys based on trust levels, which, if performed by one or more hardware processors, cause the one or more hardware processors to:
receive, by a user authentication server, an authentication request from a cloud computing service, the request comprising a client key provided by a client device seeking access to the cloud computing service;
determine whether an authentication key for a current time period is available from a number of limited-term authentication keys received at the user authentication server and sent from a key distribution host according to a trust level of the user authentication server; and
compare the client key to the authentication key for the current time period to generate an authentication result for the client device responsive to the authentication key for the current time period being available at the user authentication server to authenticate the client device requesting access to the cloud computing service.

16. The one or more machine-readable mediums of claim 15, wherein the instructions further cause the one or more processors to:
send a remote authentication request comprising the client key to the key distribution host responsive to the authentication key for the current time period not being available at the user authentication server; and
receive a remote authentication result from the key distribution host.

17. The one or more machine-readable mediums of claim 15, wherein the instructions further cause the one or more processors to:
provide the authentication result to the cloud computing service, the cloud computing service to grant access to the client device in view of the authentication result.

18. The one or more machine-readable mediums of claim 15, wherein the trust level is based, at least in part, on one or more attributes of the user authentication server.

19. The one or more machine-readable mediums of claim 18, wherein the one or more attributes of the user authentication server comprise one or more of a geographic region where the user authentication server is located, a hardware security status of the user authentication server, a software patch level of the user authentication server, a device type of the user authentication server, or an occurrence of an anomaly at the user authentication server.

20. The one or more machine-readable mediums of claim 15, wherein the one or more authentication keys received at the user authentication server from the key distribution host comprise a number of keys, each valid during a different time period, wherein the number is determined according to the trust level of the user authentication server.

* * * * *